(12) United States Patent  
Kishimoto et al.

(10) Patent No.: US 12,330,190 B2  
(45) Date of Patent: Jun. 17, 2025

(54) SCRAP DETERMINATION SYSTEM AND SCRAP DETERMINATION METHOD

(71) Applicant: JFE STEEL CORPORATION, Tokyo (JP)

(72) Inventors: Yasuo Kishimoto, Tokyo (JP); Futoshi Ogasawara, Tokyo (JP); Yasuyoshi Takao, Kawasaki (JP)

(73) Assignee: JFE STEEL CORPORATION, Tokyo (JP)

( * ) Notice: Subject to any disclaimer, the term of this patent is extended or adjusted under 35 U.S.C. 154(b) by 395 days.

(21) Appl. No.: 17/997,368

(22) PCT Filed: Apr. 23, 2021

(86) PCT No.: PCT/JP2021/016531  
§ 371 (c)(1),  
(2) Date: Oct. 28, 2022

(87) PCT Pub. No.: WO2021/220987  
PCT Pub. Date: Nov. 4, 2021

(65) Prior Publication Data  
US 2023/0173546 A1 Jun. 8, 2023

(30) Foreign Application Priority Data  
Apr. 30, 2020 (JP) ................. 2020-080778

(51) Int. Cl.  
*B07C 5/342* (2006.01)  
*G06T 7/62* (2017.01)  
*H04N 23/69* (2023.01)

(52) U.S. Cl.  
CPC ............ *B07C 5/3422* (2013.01); *G06T 7/62* (2017.01); *H04N 23/69* (2023.01); *B07C 2501/0054* (2013.01); *Y02P 10/20* (2015.11)

(58) Field of Classification Search  
CPC .......... B07C 5/3422; B07C 2501/0054; B07C 5/342; G06T 7/62; G06T 7/0004;  
(Continued)

(56) References Cited  
U.S. PATENT DOCUMENTS  
2020/0393390 A1* 12/2020 Kaji ...................... G01N 23/10

FOREIGN PATENT DOCUMENTS  
CN 1440543 A 9/2003  
CN 109919243 A 6/2019  
(Continued)

OTHER PUBLICATIONS

Sep. 6, 2023, the Extended European Search Report issued by the European Patent Office in the corresponding European Patent Application No. 21795482.5.  
(Continued)

*Primary Examiner* — Ping Y Hsieh  
*Assistant Examiner* — Vaisali Rao Koppolu  
(74) *Attorney, Agent, or Firm* — KENJA IP LAW PC

(57) ABSTRACT

Provided are a scrap determination system and method that can improve scrap determination techniques. A scrap determination system (1) comprises: a first scrap determination model (221) generated using teaching data including first learning images, and determines, based on a camera image, grade of scrap in the image and a ratio of the grade; a second scrap determination model (222) generated using teaching data including second learning images, and determines, based on the image, grade of scrap in the image and a ratio of the grade; a selection model (223) configured to determine which of the first scrap determination model (221) and the second scrap determination model (222) is to be used, based on the image; and an output section (24) configured to output information of each grade of scrap and a ratio of the  
(Continued)

grade determined based on the image using the model selected by the selection model (223).

11 Claims, 7 Drawing Sheets

(58) Field of Classification Search
CPC . G06T 7/00; H04N 23/69; Y02P 10/20; G06F 18/285; G06V 10/87; G06V 10/764; G01N 21/27; Y02W 90/00
See application file for complete search history.

(56) References Cited

FOREIGN PATENT DOCUMENTS

| | | | |
|---|---|---|---|
| CN | 109961423 A | | 7/2019 |
| CN | 110660074 A | | 1/2020 |
| CN | 110937280 A | | 3/2020 |
| EP | 3842693 A1 * | 6/2021 | ............ F23G 5/444 |
| JP | H05303642 A | | 11/1993 |
| JP | 2017109161 A | | 6/2017 |
| JP | 2017109197 A | | 6/2017 |
| JP | 2019174421 A | | 10/2019 |
| JP | 2020034267 A | | 3/2020 |
| JP | 2020062633 A | | 4/2020 |
| JP | 2020095709 A * | 6/2020 | |
| KR | 101981031 B1 * | 5/2019 | |
| WO | 0201504 A2 | | 1/2002 |

OTHER PUBLICATIONS

Jul. 20, 2021, International Search Report issued in the International Patent Application No. PCT/JP2021/016531.

Jul. 26, 2022, Notification of Reasons for Refusal issued by the Japan Patent Office in the corresponding Japanese Patent Application No. 2021-545922 with English language Concise Statement of Relevance.

Oct. 23, 2024, Office Action issued by the China National Intellectual Property Administration in the corresponding Chinese Patent Application No. 202180009958.5 with English language concise statement of relevance.

* cited by examiner

FIG. 2
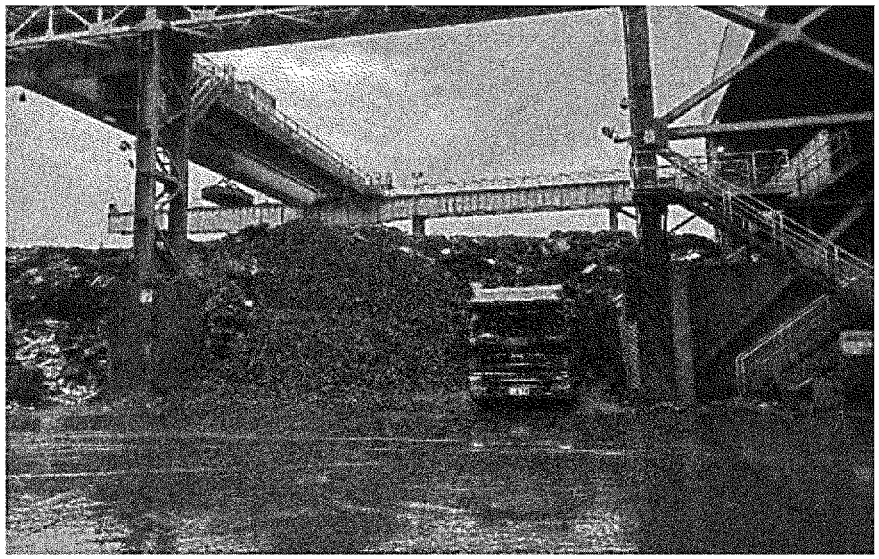

SCRAP DETERMINATION SYSTEM AND SCRAP DETERMINATION METHOD

TECHNICAL FIELD

The present disclosure relates to a scrap determination system and a scrap determination method.

BACKGROUND

In recent years, there has been demand to reuse waste such as scrap as recyclable resources for effective resource utilization. For reuse of waste, it is necessary to determine recyclable resources. Waste determination methods not relying on human power have been conventionally proposed (for example, JP 2017-109197 A (PTL 1)).

CITATION LIST

Patent Literature

PTL 1: JP 2017-109197 A

SUMMARY

Technical Problem

The technique described in PTL 1 is intended for determination of waste such as dismantled houses and disaster debris, and methods of efficiently determining scrap such as metal are not studied. For example, iron scrap is distributed in the market as a reusable resource related to iron, and is recycled into iron using electric heating furnaces or the like. Conventionally, grades of scrap are determined visually by workers at iron scrap processing sites. This is because scrap metal pieces after crushing have various scales and the shape of each scrap is different and therefore the whole needs to be visually inspected in order to make grade determination. It is thus difficult to automate scrap determination. Meanwhile, in visual determination works by workers, determination results vary depending on the skill of the workers. There is also a problem of aging of workers and difficulty in securing personnel. Hence, scrap determination techniques have room for improvement.

It could therefore be helpful to provide a scrap determination system and a scrap determination method that can improve scrap determination techniques.

Solution to Problem

A scrap determination system according to one of the disclosed embodiments comprises: an acquisition section configured to acquire a camera image including scrap; a first scrap determination model generated using teaching data including first learning images, and configured to determine, based on the camera image, each grade of the scrap included in the camera image and a ratio of the grade; a second scrap determination model generated using teaching data including second learning images different from the first learning images, and configured to determine, based on the camera image, each grade of the scrap included in the camera image and a ratio of the grade; a selection model configured to determine which of the first scrap determination model and the second scrap determination model is to be used, based on the camera image; and an output section configured to output information of each grade of the scrap and a ratio of the grade determined based on the camera image using a model selected by the selection model out of the first scrap determination model and the second scrap determination model.

A scrap determination method according to one of the disclosed embodiments is a scrap determination method that uses: a first scrap determination model generated using teaching data including first learning images, and configured to determine, based on a camera image including scrap, each grade of the scrap included in the camera image and a ratio of the grade; and a second scrap determination model generated using teaching data including second learning images different from the first learning images, and configured to determine, based on the camera image, each grade of the scrap included in the camera image and a ratio of the grade, the scrap determination method comprising: acquiring the camera image; selecting, based on the camera image, which of the first scrap determination model and the second scrap determination model is to be used, by a selection model; and outputting information of each grade of the scrap and a ratio of the grade determined based on the camera image using a model selected by the selection model out of the first scrap determination model and the second scrap determination model.

Advantageous Effect

It is thus possible to improve scrap determination techniques.

BRIEF DESCRIPTION OF THE DRAWINGS

In the accompanying drawings:

FIG. 2 illustrates specific examples of camera images of scrap to be determined;

DETAILED DESCRIPTION

Figure 1:
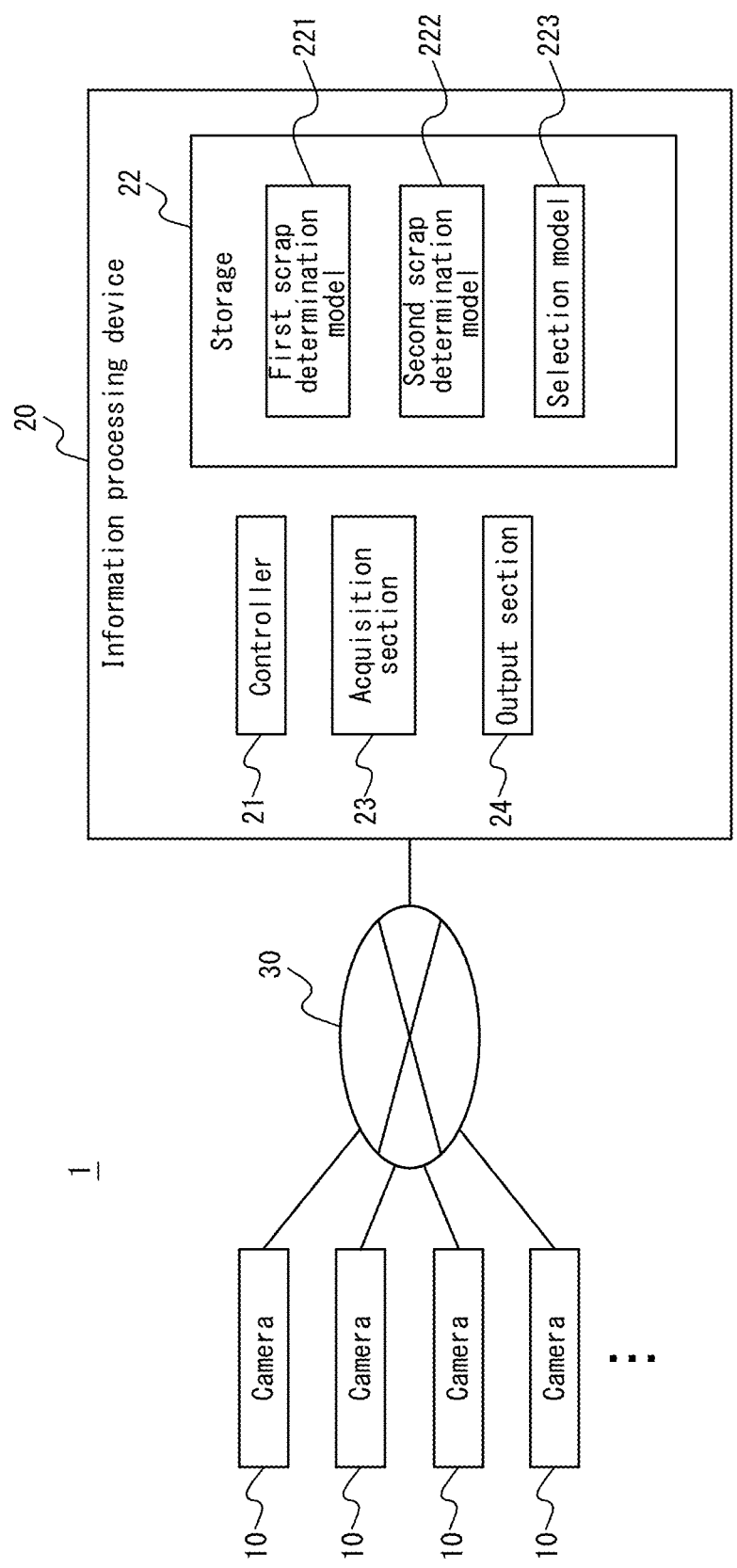
FIG. 1 is a schematic diagram illustrating the structure of a scrap determination system according to one of the disclosed embodiments.

Some of the disclosed embodiments will be described below, with reference to the drawings.

In the drawings, the same or corresponding parts are given the same reference signs. In the following description of embodiments, the description of the same or corresponding parts is omitted or simplified as appropriate.

FIG. 1 is a schematic diagram illustrating the overall structure of a scrap determination system 1 according to one of the disclosed embodiments. This embodiment describes the case where scrap to be determined is iron scrap, but scrap to be determined is not limited to iron scrap and may be, for example, other metal scrap.

Iron scrap can be roughly divided into two types based on its source. One is process scrap (also called mill scrap) generated in the production stage in the manufacturing industry. Process scrap is recovered by recovery companies, and then distributed under different names such as new scrap (shindachi), steel turnings, and pig scrap. Most of process scrap are taken by steelmakers without undergoing processing (intermediate processing). Process scrap is iron scrap of clear history, and is considered to be useful as with return scrap in terms of quality. Moreover, there is little possibility of foreign matter being mixed in during the generation, recovery, and transportation stages.

The other scrap is obsolete scrap generated as a result of aging of steel structures. Obsolete scrap includes scrap generated during the repair or damage stage. Obsolete scrap is generated in various scenes such as building dismantling, machinery renewal, used automobiles, containers, etc., and in various shapes. Therefore, recovered obsolete scrap is subjected to processing such as sizing, crushing, and volume reduction in order to increase the feed efficiency in steelmaking, and then treated as heavy scrap. Steel plate products such as home appliances, automobile bodies, and vending machines are reduced in volume mainly by crushing, and then subjected to magnetic separation to select only iron. Since such obsolete scrap becomes diverse in each of the generation, recovery, and processing stages, grade determination is performed after the processing. Grade determination for obsolete scrap is made based on the shape, i.e. the thickness, width, length, etc., of the scrap. Currently, in Japan, the Uniform Standards of Ferrous Scraps established by the Japan Ferrous Raw Materials Association in 1996 is widely used.

As mentioned earlier, grades of scrap are conventionally determined visually by workers at iron scrap processing sites. Such visual determination works by workers have problems such as variation in determination results due to different skill levels of the workers. In view of this, the scrap determination system 1 according to this embodiment performs scrap determination based on camera images of iron scrap instead of visual determination by workers.

This embodiment describes an example of determining six types of grades, namely, HS, H1, H2, and H3 which are typical among scraps and L1 and L2 of low iron quality such as rusted galvanized iron plates, although the grades to be determined are not limited to such. The grades to be determined may include new scrap (shear chips), turnings (cutting chips), and the like. Thus, the scrap grades to be determined in this embodiment may include any shape of scrap grades according to the needs of manufacturing sites.

As illustrated in FIG. 1, the scrap determination system 1 according to this embodiment includes a plurality of cameras 10 and an information processing device 20. The plurality of cameras 10 and the information processing device 20 are connected via a network 30. The plurality of cameras 10 are, for example, network cameras, and transmit captured camera images to the information processing device 20 via the network 30. Although the number of cameras 10 is four in FIG. 1, the number of cameras 10 is not limited to such. The number of cameras 10 may be less than four, and may be one. The number of cameras 10 may be more than four. A camera image is an image of iron scrap taken when the iron scrap has been moved to a yard after being transported by a truck. FIG. 2 illustrates specific examples of camera images taken by the cameras 10. As illustrated in FIG. 2, scrap included in each camera image is a mixture of iron scrap of a plurality of grades. The information processing device 20 determines the grades of iron scrap in the camera image and the ratio of each grade, based on a plurality of models generated by machine learning. In actual operation, scrap is traded based on the weight ratio of each grade and the total weight of the scrap. This embodiment describes an example in which the information processing device 20 determines the ratio relating to the weight of scrap of each grade in a camera image.

The information processing device 20 includes a controller 21, a storage 22, an acquisition section 23, and an output section 24.

The controller 21 includes at least one processor, at least one dedicated circuit, or a combination thereof. Examples of the processor include a general-purpose processor such as a central processing unit (CPU), and a dedicated processor specialized in a specific process. Examples of the dedicated circuit include a field-programmable gate array (FPGA) and an application specific integrated circuit (ASIC). The controller 21 executes a process relating to the operation of the information processing device 20 while controlling each component in the information processing device 20.

The storage 22 includes at least one semiconductor memory, at least one magnetic memory, at least one optical memory, or a combination of two or more thereof. Examples of the semiconductor memory include a random access memory (RAM) and a read only memory (ROM). The RAM is, for example, a static random access memory (SRAM) or a dynamic random access memory (DRAM). The ROM is, for example, an electrically erasable programmable read only memory (EEPROM). For example, the storage 22 functions as a main storage device, an auxiliary storage device, or a cache memory. The storage 22 stores data used for the operation of the information processing device 20 and data obtained as a result of the operation of the information processing device 20. For example, the storage 22 stores a first scrap determination model 221, a second scrap determination model 222, and a selection model 223.

Figure 3:
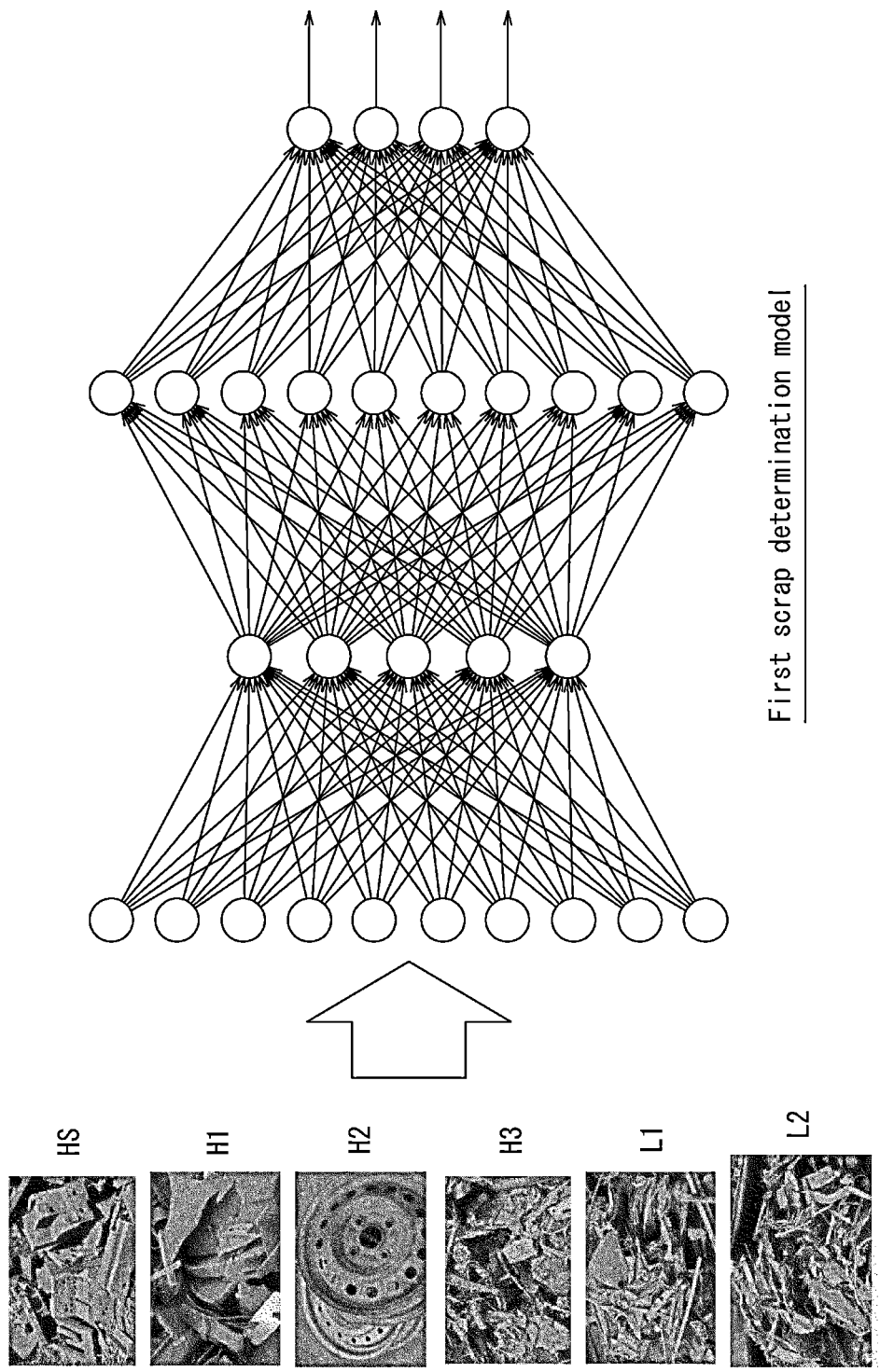
FIG. 3 is a schematic diagram illustrating a learning process by a first scrap determination model.

The first scrap determination model 221 is a learning model for determining each grade of scrap included in a camera image and the ratio of the grade based on the camera image. The first scrap determination model 221 is generated based on teaching data including first learning images. Each first learning image is an image of single-grade iron scrap. In detail, the first scrap determination model 221 is generated by machine learning using a machine learning algorithm such as neural network, based on teaching data including first learning images and track record data of determination for the first learning images. FIG. 3 schematically illustrates a learning process by the first scrap determination model 221. As illustrated in FIG. 3, first learning images which are each an image of single-grade iron scrap are input to an input layer of the first scrap determination model 221. Each image of single-grade iron scrap is associated with track record data of a grade determined by an operator. The weight coefficients between neurons are adjusted using the teaching data, and the learning process by the first scrap determination model 221 is performed. Although the respective images are associated with HS, H1, H2, H3, L1, and L2 in FIG. 3, the grades are not limited to such. An iron scrap image of any other grade may be used as an image of single-grade iron scrap. Although the first scrap determination model 221 is generated based on a multi-layer perceptron composed of an input layer, a hidden layer, and an output layer in FIG. 3, the first scrap determination model 221 is not limited to such. The first scrap determination model 221 may be generated by any other machine learning algorithm. For example, the first scrap determination model 221 may be generated based on a machine learning algorithm such as convolutional neural network (CNN) or deep learning.

Figure 4:
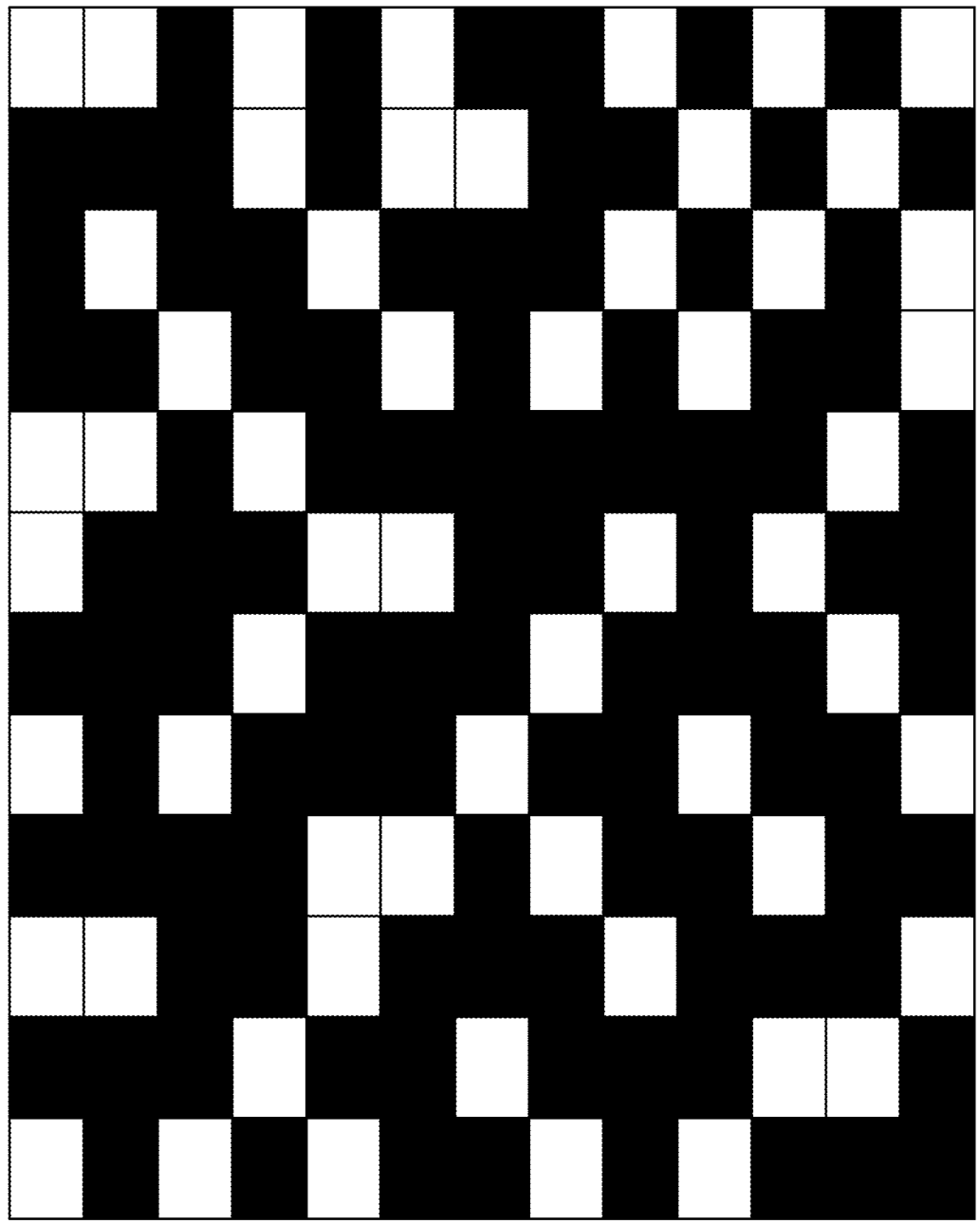
FIG. 4 is a schematic diagram illustrating a determination process by the first scrap determination model.

When determining each grade of scrap included in a camera image and the ratio of the grade, the controller 21 determines, based on the area ratio of scrap of each grade in the camera image, the ratio of the scrap, using the first scrap determination model 221. FIG. 4 schematically illustrates a determination process by the first scrap determination model 221. As illustrated in FIG. 4, the controller 21 inputs an image of each part of a camera image divided in a grid pattern to the first scrap determination model 221, and determines the grade of scrap in the partial image. The controller 21 randomly extracts partial images of the camera image divided in a grid pattern and determines the grade of scrap in each partial image, and calculates the area ratio of each grade of scrap in the image. Further, the controller 21 converts the area ratio into the weight ratio based on the bulk density of each scrap. Thus, the controller 21 calculates each grade of scrap included in the camera image and the ratio of the grade. Although an example in which the controller 21 randomly extracts partial images of the camera image and calculates the area ratio is described here, the determination process is not limited to such. For example, the controller 21 may calculate the area ratio based on all partial images constituting the camera image.

Figure 5:
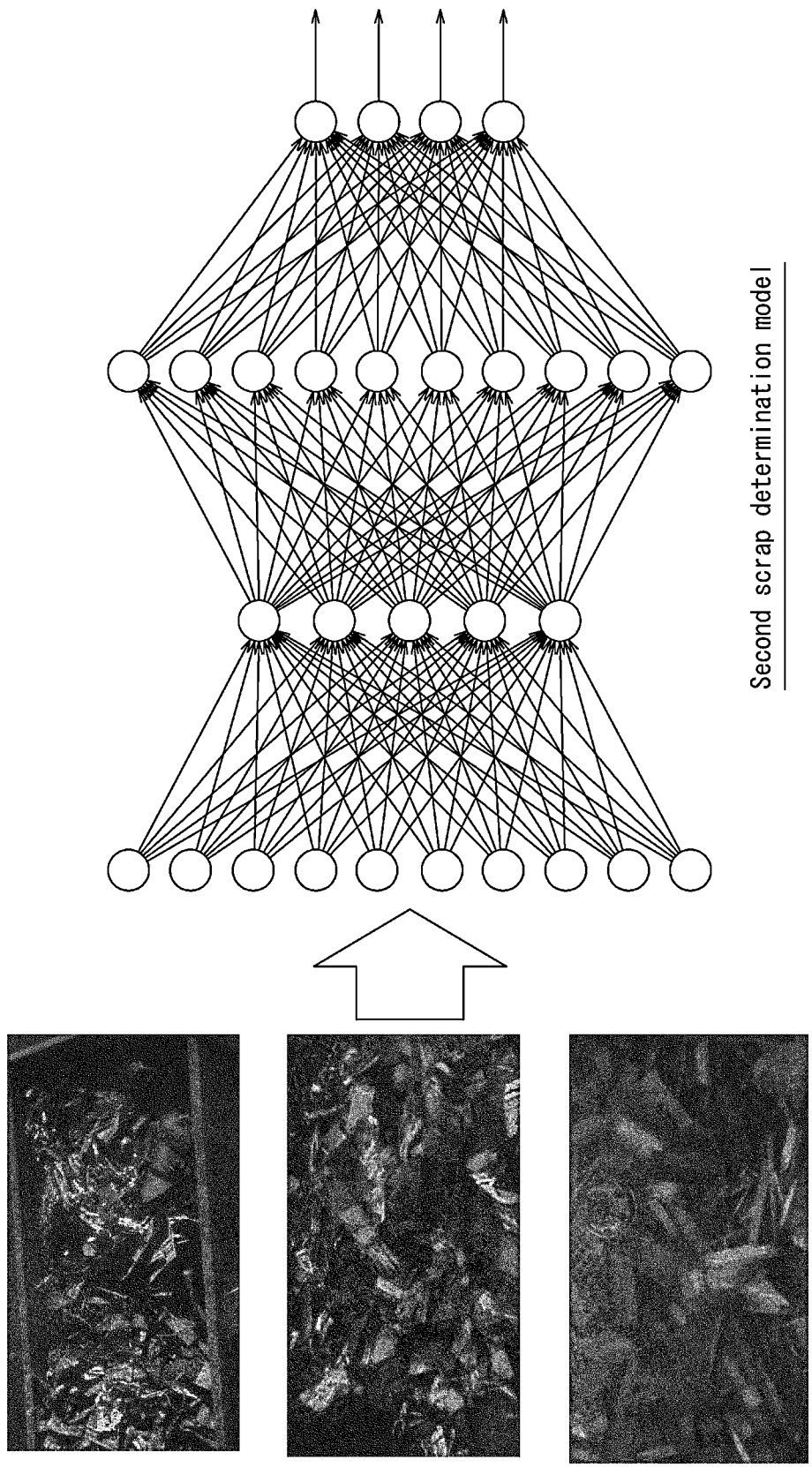
FIG. 5 is a schematic diagram illustrating a learning process by a second scrap determination model.

The second scrap determination model 222 is a learning model for determining each grade of scrap included in a camera image and the ratio of the grade based on the camera image. The second scrap determination model 222 is generated based on teaching data including second learning images different from the first learning images. Each second learning image is an image of mixed-grade iron scrap. Mixed-grade iron scrap is iron scrap containing iron scraps of a plurality of grades. In detail, the second scrap determination model 222 is generated by machine learning using a machine learning algorithm such as neural network, based on teaching data including second learning images and track record data of determination for the second learning images. FIG. 5 schematically illustrates a learning process by the second scrap determination model 222. As illustrated in FIG. 5, second learning images which are each an image of mixed-grade iron scrap are input to an input layer of the second scrap determination model 222. Each image of mixed-grade iron scrap is associated with track record data of a grade and the ratio of the grade determined by an operator. The weight coefficients between neurons are adjusted using the teaching data, and the learning process by the model is performed. Although the second scrap determination model 222 is generated based on a multi-layer perceptron composed of an input layer, a hidden layer, and an output layer in FIG. 5, the second scrap determination model 222 is not limited to such. The second scrap determination model 222 may be generated by any other machine learning algorithm. For example, the second scrap determination model 222 may be generated based on a machine learning algorithm such as convolutional neural network (CNN) or deep learning. When determining each grade of scrap included in a camera image and the ratio of the grade using the second scrap determination model 222, the controller 21 randomly extracts partial images of the camera image divided and determines the grade of scrap in each partial image, and calculates the weight ratio of each grade of scrap in the image, as in the first scrap determination model 221. This is because the determination accuracy can be improved by dividing an image and determining randomly selected images many times. Although an example in which the controller 21 randomly extracts partial images of the camera image and calculates the weight ratio of each grade of scrap is described here, the determination process is not limited to such, as in the first scrap determination model 221. For example, the controller 21 may calculate the weight ratio based on all partial images constituting the camera image.

The selection model 223 is a model for estimating, based on a camera image, which of the first scrap determination model 221 and the second scrap determination model 222 outputs a more probable solution when determining each grade of scrap included in the camera image and the ratio of the grade. The selection model 223 selects the model that outputs a more probable solution, based on the estimation result. The controller 21 determines each grade of scrap and the ratio of the grade based on the camera image, using the model selected by the selection model 223. In other words, the selection model 223 determines which of the first scrap determination model 221 and the second scrap determination model 222 is to be used for scrap grade determination, based on the camera image. Teaching data for the selection model 223 includes a camera image of scrap acquired from each camera 10 via the network 30, each grade of scrap and the ratio of the grade estimated by the first scrap determination model 221, each grade of scrap and the ratio of the grade estimated by the second scrap determination model 222, and track record data of each grade and the ratio of the grade determined by an operator. The track record data for model selection is based on the determination result when inputting the camera image to each of the first scrap determination model 221 and the second scrap determination model 222 and the result of the operator determining the grades and the ratio of each grade for the camera image. The selection model 223 is an estimation model generated by machine learning using a machine learning algorithm such as neural network, based on such teaching data. For example, the selection model 223 is generated based on a machine learning algorithm such as multi-layer perceptron, convolutional neural network (CNN), or deep learning.

The acquisition section 23 acquires a camera image including scrap from each camera 10 via the network 30. The acquisition section 23 includes at least one communication interface. Examples of the communication interface include a LAN interface, a WAN interface, an interface that complies with a mobile communication standard such as Long Term Evolution (LTE), 4G (4th generation), or 5G (5th generation), and an interface that complies with short-range wireless communication such as Bluetooth® (Bluetooth is a registered trademark in Japan, other countries, or both). The acquisition section 23 receives data used for the operation of the information processing device 20, and transmits data obtained as a result of the operation of the information processing device 20.

The output section 24 includes at least one output interface. An example of the output interface is a display. The display is, for example, a liquid crystal display (LCD) or an organic electroluminescent (EL) display. The output section 24 outputs data obtained as a result of the operation of the information processing device 20. The output section 24 may be connected to the information processing device 20 as an external output device, instead of being included in the information processing device 20. As a connection method, any method such as USB, HDMI®, or Bluetooth® may be used.

The functions of the information processing device 20 are implemented by a program according to this embodiment being executed by a processor corresponding to the controller 21. That is, the functions of the information processing device 20 are implemented by software. The program causes a computer to execute the operation of the information processing device 20, thus causing the computer to function as the information processing device 20. In other words, the computer executes the operation of the information processing device 20 according to the program to thus function as the information processing device 20.

In this embodiment, the program can be recorded in a computer-readable recording medium. The computer-readable recording medium includes a non-transitory computer-readable medium, such as a magnetic recording device, an optical disc, a magneto-optical recording medium, or a semiconductor memory. The program is distributed, for example, by selling, transferring, or renting a portable recording medium having the program recorded therein, such as a digital versatile disc (DVD) or a compact disc read only memory (CD-ROM). The program may be distributed by storing the program in a storage of a server and transmitting the program from the server to another computer. The program may be provided as a program product.

In this embodiment, for example, the computer once stores, in the main storage device, the program recorded in the portable recording medium or the program transmitted from the server, and then reads the program stored in the main storage device by the processor and executes a process according to the read program by the processor. The computer may read the program directly from the portable recording medium and execute the process according to the program. Each time the computer receives the program from the server, the computer may execute the process according to the received program. Without the program being transmitted from the server to the computer, the process may be executed by application service provider (ASP) services that implement the functions by only execution instruction and result acquisition. The program includes information that is to be processed by an electronic computer and is equivalent to a program. For example, data that is not a direct command to the computer but has the property of defining a process of the computer is "equivalent to a program".

All or part of the functions of the information processing device 20 may be implemented by a dedicated circuit corresponding to the controller 21. That is, all or part of the functions of the information processing device 20 may be implemented by hardware.

Figure 6:
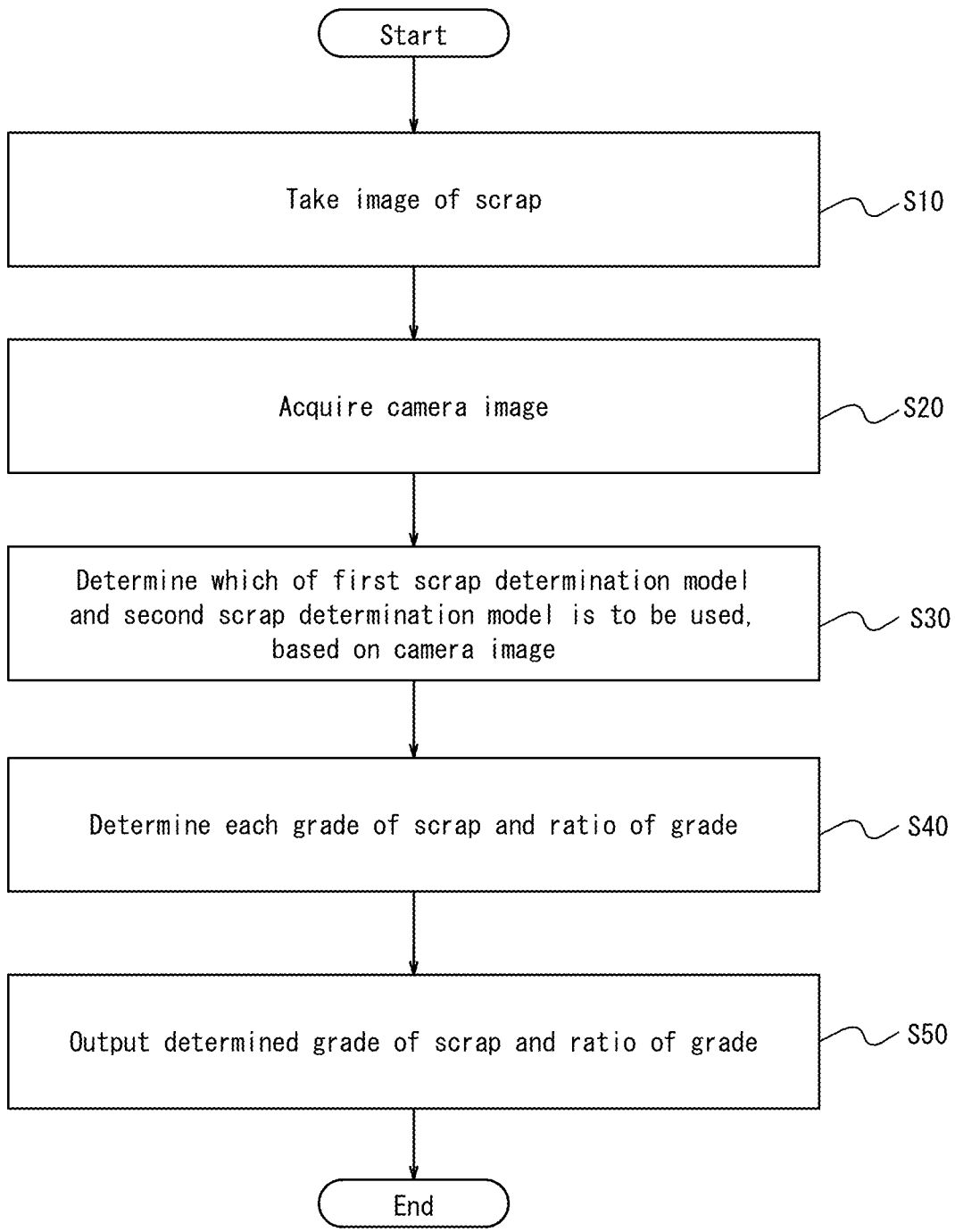
FIG. 6 is a flowchart illustrating a scrap determination method according to one of the disclosed embodiments.

A scrap determination method executed by the scrap determination system 1 according to one of the disclosed embodiments will be described below. FIG. 6 is a flowchart illustrating a scrap determination method according to one of the disclosed embodiments.

First, each camera 10 in the scrap determination system 1 takes a camera image including scrap (step S10). The camera 10 then transmits the camera image to the information processing device 20 via the network 30. The acquisition section 23 in the information processing device 20 acquires the camera image via the network 30 (step S20).

Following this, the controller 21 determines, based on the acquired camera image, which of the first scrap determination model 221 and the second scrap determination model 222 is to be used, using the selection model 223 (step S30).

The controller 21 then determines each grade of scrap included in the camera image and the ratio of the grade, using the model selected by the selection model 223 out of the first scrap determination model 221 and the second scrap determination model 222 (step S40).

The controller 21 then instructs the output section 24 to output the grade of scrap and the ratio determined in step S40. The output section 24 outputs the grade of scrap and the ratio determined in step S40 (step S50).

Thus, the scrap determination system 1 according to one of the disclosed embodiments can automatically determine scrap grades and their ratios from a camera image of scrap taken by each camera 10, using the first scrap determination model 221 or the second scrap determination model 222. Here, which of the first scrap determination model 221 and the second scrap determination model 222 is to be used is selected by the selection model 223, so that a more appropriate model is automatically selected. In other words, the scrap determination system 1 according to one of the disclosed embodiments can determine and output scrap grades and their ratios without manual intervention. The scrap determination system 1 according to one of the disclosed embodiments can therefore improve scrap determination techniques.

While the presently disclosed techniques have been described by way of the drawings and embodiments, various changes and modifications may be easily made by those of ordinary skill in the art based on the present disclosure. Such changes and modifications are therefore included in the scope of the present disclosure. For example, the functions included in the components, steps, etc. may be rearranged without logical inconsistency, and a plurality of components, steps, etc. may be combined into one component, step, etc. and a component, step, etc. may be divided into a plurality of components, steps, etc.

For example, in the learning process and the determination process of each of the first scrap determination model 221, the second scrap determination model 222, and the selection model 223, the controller 21 may use zoom information corresponding to each image. In the case of using zoom information, each camera 10 transmits, together with a camera image, zoom information of open network video interface forum (ONVIF) data corresponding to the camera image, to the information processing device 20 via the network 30. For example, the first learning images, the second learning images, and the camera images may each be normalized based on zoom information corresponding to the image. In detail, the controller 21 normalizes each of the first learning images, the second learning images, and the camera images to a predetermined magnification factor based on the zoom information corresponding to the image. The controller 21 then performs the learning process using the normalized first learning images or second learning images, and performs the determination process based on the camera images. As a result of normalizing each image by such a normalization process, the determination accuracy of the scrap determination system 1 can be enhanced.

Figure 7:
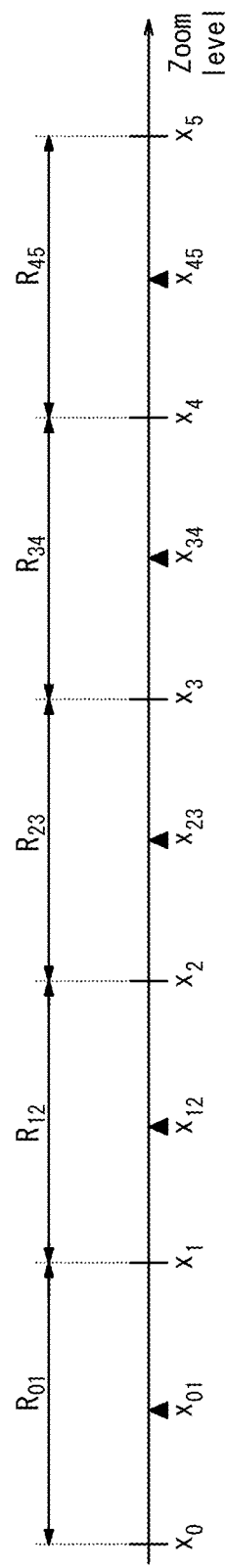
FIG. 7 is a conceptual diagram of normalization for each group depending on the camera image zoom level.

In the case of normalizing each image to a predetermined magnification factor based on the corresponding zoom information, the controller 21 may classify images into groups and perform normalization to a different magnification factor for each group based on zoom information. FIG. 7 is a conceptual diagram of normalization for each group of camera images. In FIG. 7, each camera image is classified depending on the magnification factor. Specifically, in the case where the magnification factor of the camera image is in a range $R_{01}$ of $x_0$ or more and less than $x_1$ (hereafter also referred to as "first range $R_{01}$"), the camera image is classified into a first group. In the case where the magnification factor of the camera image is in a range $R_{12}$ of $x_1$ or more and less than $x_2$ (hereafter also referred to as "second range $R_{12}$"), the camera image is classified into a second group. In the case where the magnification factor of the camera image is in a range $R_{23}$ of $x_2$ or more and less than $x_3$ (hereafter also referred to as "third range $R_{23}$"), the camera image is classified into a third group. In the case where the magnification factor of the camera image is in a range $R_{34}$ of $x_3$ or more and less than $x_4$ (hereafter also referred to as "fourth range $R_{34}$"), the camera image is classified into a fourth group. In the case where the magnification factor of the camera image is in a range $R_{45}$ of $x_4$ or more and less than $x_5$ (hereafter also referred to as "fifth range $R_{45}$"), the camera image is classified into a fifth group. The camera images in the first range $R_{01}$, the second range $R_{12}$, the third range $R_{23}$, the fourth range $R_{34}$, and the fifth range $R_{45}$ are respectively normalized to magnification factors $X_{01}$, $X_{12}$, $X_{23}$, $X_{34}$, and $X_{45}$ each as a normal magnification factor of the corresponding range. That is, the first learning images, the second learning images, and the camera images are each normalized to a magnification factor that differs depending on the zoom information corresponding to the image. In other words, the controller 21 normalizes each camera image to one of a plurality of normal magnification factors that is selected based on the zoom information of the camera image. In this way, variation in image resolution caused by excessive enlargement or reduction of camera images can be suppressed, and the determination accuracy of the scrap determination system 1 can be enhanced. Although the controller 21 classifies images into five groups and normalizes each image to the corresponding one of the five magnification factors in FIG. 7, the classification is not limited to such. For example, the number of groups into which images are classified may be four or less or six or more, and the controller 21 may normalize each image to a magnification factor that differs depending on the group.

Although an example in which zoom information of camera images is used in each of the learning process and the determination process is described above, the information used is not limited to such. For example, the scrap determination system 1 may use at least part of ONVIF data obtained from each camera 10, in each of the learning process and the determination process. The ONVIF data includes pan, tilt, and zoom information. That is, the scrap determination system 1 may perform the learning process and the determination process using at least one of pan, tilt, and zoom information.

For example, in the learning process and the determination process of each of the first scrap determination model 221, the second scrap determination model 222, and the selection model 223, the controller 21 may use information about a carry-in company that carries scrap in. This makes it possible to perform determination in consideration of the tendency of scrap carried in by each carry-in company, so that the determination accuracy of the scrap determination system 1 can be improved.

For example, the scrap determination system 1 and scrap determination system 2 may further accumulate each camera image used in the determination process as new teaching data after the determination. The controller 21 may then relearn, based on the camera image, the first scrap determination model 221, the second scrap determination model 222, and the selection model 223, using the result of the operator determining each grade and the ratio of the grade. For example, if there is a problem with the output result (determination result), the output information having the problem, the camera image and the track record data corresponding to the information may be used as teaching data to perform relearning of at least one of the first scrap determination model 221, the second scrap determination model 222, and the selection model 223. This can improve the determination accuracy and speed of the first scrap determination model 221, the second scrap determination model 222, and the selection model 223.

Although the foregoing embodiment describes the case where a camera image is an image of iron scrap taken when the iron scrap has been moved to a yard after being transported by a truck, the camera image is not limited to such. For example, the camera image may be an image of scrap in a state of being lifted with a crane at a manufacturing site. In this case, a lighting device for illuminating the scrap during photographing may be used. A clear camera image can thus be obtained.

REFERENCE SIGNS LIST

1 scrap determination system
10 camera
20 information processing device
21 controller
22 storage
23 acquisition section
24 output section
221 first scrap determination model
222 second scrap determination model
223 selection model
30 network

The invention claimed is:

1. A scrap determination system comprising:
   an acquisition section configured to acquire a camera image including scrap;
   a first scrap determination model generated using teaching data including first learning images, and configured to determine, based on the camera image, each of the grade of the scrap included in the camera image and a ratio of the grade;
   a second scrap determination model generated using teaching data including second learning images different from the first learning images, and configured to determine, based on the camera image, each of the grade of the scrap included in the camera image and a ratio of the grade;
   a selection model configured to determine which of the first scrap determination model and the second scrap determination model is to be used, based on the camera image; and
   an output section configured to output information of each grade of the scrap and a ratio of the grade determined based on the camera image using a model selected by the selection model out of the first scrap determination model and the second scrap determination model.

2. The scrap determination system according to claim 1, wherein the first learning images are each an image of single-grade iron scrap, and
   when determining each of the grade of the scrap included in the camera image and a ratio of the grade using the first scrap determination model, the ratio of the grade is determined based on an area ratio of scrap of the grade in the camera image.

3. The scrap determination system according to claim 1, wherein the second learning images are each an image of mixed-grade iron scrap.

4. The scrap determination system according to claim 1, wherein the first learning images, the second learning images, and the camera image are each normalized based on zoom information corresponding to the camera image.

5. The scrap determination system according to claim 4, wherein the first learning images, the second learning images, and the camera image are each normalized to a magnification factor that differs depending on the zoom information corresponding to the camera image.

6. The scrap determination system according to claim 1, wherein at least one of the first scrap determination model, the second scrap determination model, and the selection model is relearned based on the camera image and the information output by the output section.

7. A scrap determination method that uses: a first scrap determination model generated using teaching data including first learning images, and configured to determine, based on a camera image including scrap, each of the grade of the scrap included in the camera image and a ratio of the grade; and a second scrap determination model generated using teaching data including second learning images different from the first learning images, and configured to determine, based on the camera image, each of the grade of the scrap included in the camera image and a ratio of the grade, the scrap determination method comprising:

acquiring the camera image;

selecting, based on the camera image, which of the first scrap determination model and the second scrap determination model is to be used, by a selection model; and outputting information of each grade of the scrap and a ratio of the grade determined based on the camera image using a model selected by the selection model out of the first scrap determination model and the second scrap determination model.

8. The scrap determination system according to claim 2, wherein the second learning images are each an image of mixed-grade iron scrap.

9. The scrap determination system according to claim 2, wherein the first learning images, the second learning images, and the camera image are each normalized based on zoom information corresponding to the camera image.

10. The scrap determination system according to claim 9, wherein the first learning images, the second learning images, and the camera image are each normalized to a magnification factor that differs depending on the zoom information corresponding to the camera image.

11. The scrap determination system according to claim 2, wherein at least one of the first scrap determination model, the second scrap determination model, and the selection model is relearned based on the camera image and the information output by the output section.

* * * * *